US008633959B2

(12) United States Patent
An et al.

(10) Patent No.: US 8,633,959 B2
(45) Date of Patent: Jan. 21, 2014

(54) VIDEO TELEPHONY APPARATUS AND SIGNAL TRANSMITTING/RECEIVING METHOD FOR MOBILE TERMINAL

(75) Inventors: Dae Won An, Gumi-si (KR); Min Hong Park, Busan Metropolitan (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1650 days.

(21) Appl. No.: 11/825,581

(22) Filed: Jul. 6, 2007

(65) Prior Publication Data

US 2008/0094467 A1 Apr. 24, 2008

(30) Foreign Application Priority Data

Oct. 24, 2006 (KR) ............... 2006-0103259

(51) Int. Cl.
*H04N 7/14* (2006.01)

(52) U.S. Cl.
USPC ...................................... 348/14.02

(58) Field of Classification Search
USPC ............... 348/14.01–14.09, 14.1, 14.13–14.6
See application file for complete search history.

(56) References Cited

U.S. PATENT DOCUMENTS

| | | | | |
|---|---|---|---|---|
| 6,349,303 | B1 * | 2/2002 | Saito | 1/1 |
| 6,771,302 | B1 * | 8/2004 | Nimri et al. | 348/14.08 |
| 7,181,240 | B2 * | 2/2007 | Kawamoto | 455/556.1 |
| 7,522,182 | B2 * | 4/2009 | Bang | 348/14.08 |
| 7,532,229 | B2 * | 5/2009 | Sugihara | 348/14.01 |
| 7,830,408 | B2 * | 11/2010 | Asthana et al. | 348/14.08 |
| 2004/0145654 | A1 * | 7/2004 | Motohashi | 348/14.02 |
| 2004/0189791 | A1 * | 9/2004 | Haruki | 348/14.01 |
| 2004/0189793 | A1 * | 9/2004 | Wang et al. | 348/14.08 |
| 2005/0097463 | A1 * | 5/2005 | Yu | 715/531 |
| 2007/0070182 | A1 * | 3/2007 | Ryu et al. | 348/14.02 |
| 2007/0083608 | A1 * | 4/2007 | Baxter et al. | 709/217 |

FOREIGN PATENT DOCUMENTS

| | | | | |
|---|---|---|---|---|
| KR | 1999-64087 | 7/1999 | ............... | H04N 7/32 |
| KR | 2006-23823 | 3/2006 | ............... | H04N 5/04 |
| KR | 2006-28609 | 3/2006 | ............... | H04B 1/38 |

OTHER PUBLICATIONS

TTAE.IT-H324; "Terminal for Low Bit-Rate Multimedia Communication;" Telecommunications Technology Associations; Jun. 29, 2006; 84 pgs.

* cited by examiner

*Primary Examiner* — Brandon Miller
(74) *Attorney, Agent, or Firm* — Cha & Reiter, LLC.

(57) ABSTRACT

A video telephony apparatus and signal transmitting/receiving method for a mobile terminal are disclosed. The video telephony apparatus includes: a radio frequency unit for establishing a video call connection; an audio processor for collecting and reproducing an audio signal including a voice signal; a caption generator for converting the voice signal into a text caption signal; a camera module for photographing target objects to generate an image signal carrying photographed images; a video processor for combining the text caption signal and image signal into a video signal; a display unit for displaying visual image data; and a control unit for controlling the radio frequency unit to transmit the video signal. As a result, text captions corresponding to a voice signal can enhance the conversations during a mobile video telephony service.

19 Claims, 6 Drawing Sheets

VIDEO TELEPHONY APPARATUS AND SIGNAL TRANSMITTING/RECEIVING METHOD FOR MOBILE TERMINAL

CLAIMS OF PRIORITY

This application claims priority to an application entitled "VIDEO TELEPHONY APPARATUS AND SIGNAL TRANSMITTING/RECEIVING METHOD FOR MOBILE TERMINAL," filed in the Korean Intellectual Property Office on Oct. 24, 2006 and assigned Ser. No. 2006-0103259, the contents of which are incorporated herein by reference.

BACKGROUND OF THE INVENTION

1. Field of the Invention

The present invention relates generally to a mobile terminal and, more particularly, to a video telephony apparatus and signal transmitting/receiving method for a mobile terminal capable of providing text information corresponding to a voice signal along with the video images for clearer phone conversations.

2. Description of the Related Art

A video telephony service enables users of camera-equipped mobile terminals to see each other during phone conversations which can be provided through a circuit-switched network, such as a public switched telephone network (PSTN) or through a packet-switched network, i.e., an Internet Protocol (IP)-based network.

A video telephony service must be implemented according to the H.323 or H.324M recommendation from the International Telecommunications Union (ITU). H.323 is an umbrella recommendation for providing a video telephony service on a packet-switched network. That is, H.324 is an ITU umbrella recommendation for voice, video and data transmission over a traditional circuit-switched network.

H.324 and several mobile specific annexes are generally referred to as H.324M (M for mobility). H.324M is an umbrella protocol referring to H.261, H.263 and MPEG-4 for video coding, and to G.723.1 for audio coding. H.261 describes video coding and decoding for video telephony and video conferencing. H.263 and MPEG-4 aim to provide a higher quality video than H.261. G.723.1 describes speech coding and decoding for a data rate lower than or equal to 8 Kbps. The 3rd Generation Partnership Project (3GPP) has adapted H.324M to form 3G-324M for circuit-switched 3G networks. In 3G-324M, adaptive multi-rate (AMR) speech coding is mandatory, and G.723.1 speech coding is optional.

Further, H.324M refers to H.223 describing multiplexing and demultiplexing of video, audio, and data. It also refers to H.245 describing messages and control procedures for opening and closing logical channels for audio, video, and data.

In the H.324M video telephony service, a calling mobile terminal places a call to a called mobile terminal, and in turn, the called mobile terminal accepts the call, thereby establishing a call connection between the calling mobile terminal and called mobile terminal for a video conversion.

During a video call, both photographed images of target objects near to one mobile terminal and collected audio signals are transmitted to the other mobile terminal. Particularly, in a crowded and noisy environment, not only a speech signal of a user but also various noise signals are collected and transmitted to the other mobile terminal, and the noise signals may hinder clear conversations between the users.

SUMMARY OF THE INVENTION

The present invention has been made in view of the above problems and provides additional advantages, by providing a video telephony apparatus and signal transmitting/receiving method for a mobile terminal capable of providing text information corresponding to a voice signal along with video images for achieving clearer phone conversations.

In accordance with an exemplary embodiment of the present invention, a signal transmitting method for a mobile terminal includes: establishing a video call connection to another mobile terminal; setting a captioned video mode according to a user selection; collecting both an image signal carrying photographed images and an audio signal including a voice signal; generating a text caption signal using the voice signal; combining the text caption signal and image signal into a video signal; encoding and compressing the video signal; and multiplexing the compressed video signal and the audio signal into a multiplex signal, and transmitting the multiplex signal to the other mobile terminal.

In accordance with another exemplary embodiment of the present invention, a signal receiving method for a mobile terminal includes: establishing a video call connection to another mobile terminal; receiving a multiplex signal through the video call connection; demultiplexing the received multiplex signal into an audio signal, video signal, and control signal; reproducing the audio signal through a speaker; separating the video signal into a text caption signal and an image signal; displaying the text caption signal and image signal in a manner synchronized with the audio signal.

In accordance with another exemplary embodiment of the present invention, a signal transmitting/receiving method for mobile terminals includes: establishing a video call connection between a sending mobile terminal and a receiving mobile terminal; converting a voice signal in a collected audio signal into a text caption signal; multiplexing the audio signal, the text caption signal, and an image signal carrying photographed images into a multiplex signal; transmitting the multiplex signal through the video call connection; receiving the multiplex signal through the video call connection; and demultiplexing the received multiplex signal into audio data, text caption data and image data, and outputting the audio data, text caption data and image data.

In accordance with another exemplary embodiment of the present invention, there is provided a video telephony apparatus for a mobile terminal, including: a radio frequency unit for establishing a video call connection; an audio processor for collecting and reproducing an audio signal including a voice signal; a caption generator for converting the voice signal into a text caption signal; a camera module for photographing target objects to generate an image signal carrying photographed images; a video processor for combining the text caption signal and image signal into a video signal; a display unit for displaying visual image data; and a control unit for controlling the radio frequency unit to transmit the video signal.

BRIEF DESCRIPTION OF THE DRAWINGS

The above features and advantages of the present invention will be more apparent from the following detailed description in conjunction with the accompanying drawings, in which.

DETAILED DESCRIPTION OF EXEMPLARY EMBODIMENTS

Hereinafter, exemplary embodiments of the present invention are described in detail with reference to the accompanying drawings. The same reference symbols identify the same or corresponding elements in the drawings. For the purposes of clarity and simplicity, detailed descriptions of constructions or processes known in the art may be omitted to avoid obscuring the invention in unnecessary detail. Particular terms may be defined to describe the invention in the best manner. Accordingly, the meaning of specific terms or words used in the specification and the claims should not be limited to the literal or commonly employed sense, but should be construed in accordance with the spirit of the invention. The description of the various embodiments is to be construed as exemplary only and does not describe every possible instance of the invention. Therefore, it should be understood that various changes may be made and equivalents may be substituted for elements of the invention.

Note that a mobile terminal is a terminal that can place and receive a video call, and may be any information and communication appliance or multimedia appliance, such as a mobile communication terminal, digital broadcast receiving terminal, personal digital assistant (PDA), smart phone, international mobile telecommunications 2000 (IMT 2000) terminal, wideband code division multiple access (WCDMA) terminal, and universal mobile telecommunications system (UMTS) terminal. The present invention may also be applied to applications using such appliances.

For the purpose of description and to avoid redundancy, some signals during a video call are named as follows in this application. A camera module outputs an image signal (S_sig) carrying photographed images of target objects, and a microphone outputs an audio signal (A_sig) that includes a voice signal (V_sig) of a user. The voice signal in the audio signal is converted into a text caption signal (T_sig). The image signal and the text caption signal are combined into a video signal (U_sig), which is then encoded and compressed into a compressed video signal (H_sig). The audio signal, the compressed video signal), and a control signal (C_sig) are multiplexed into a multiplex signal (M_sig) to be transmitted.

Figure 1:
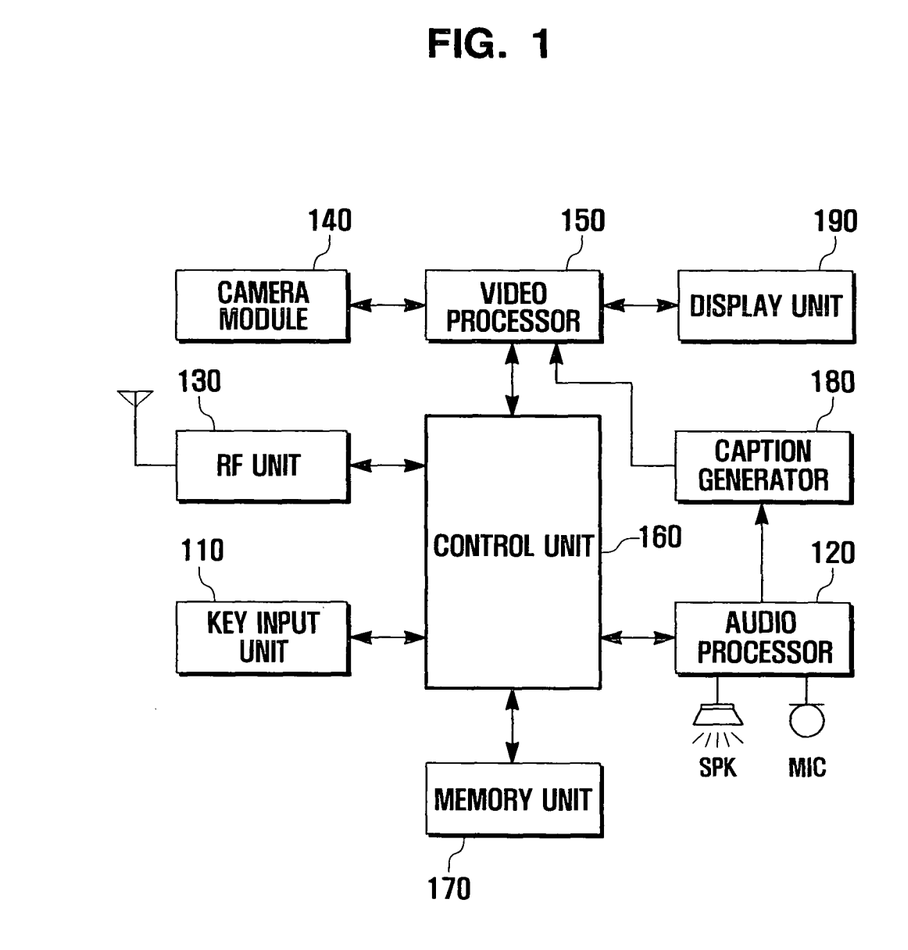
FIG. 1 illustrates a configuration of a mobile terminal having a video telephony apparatus according to an exemplary embodiment of the present invention.
Figure 2:
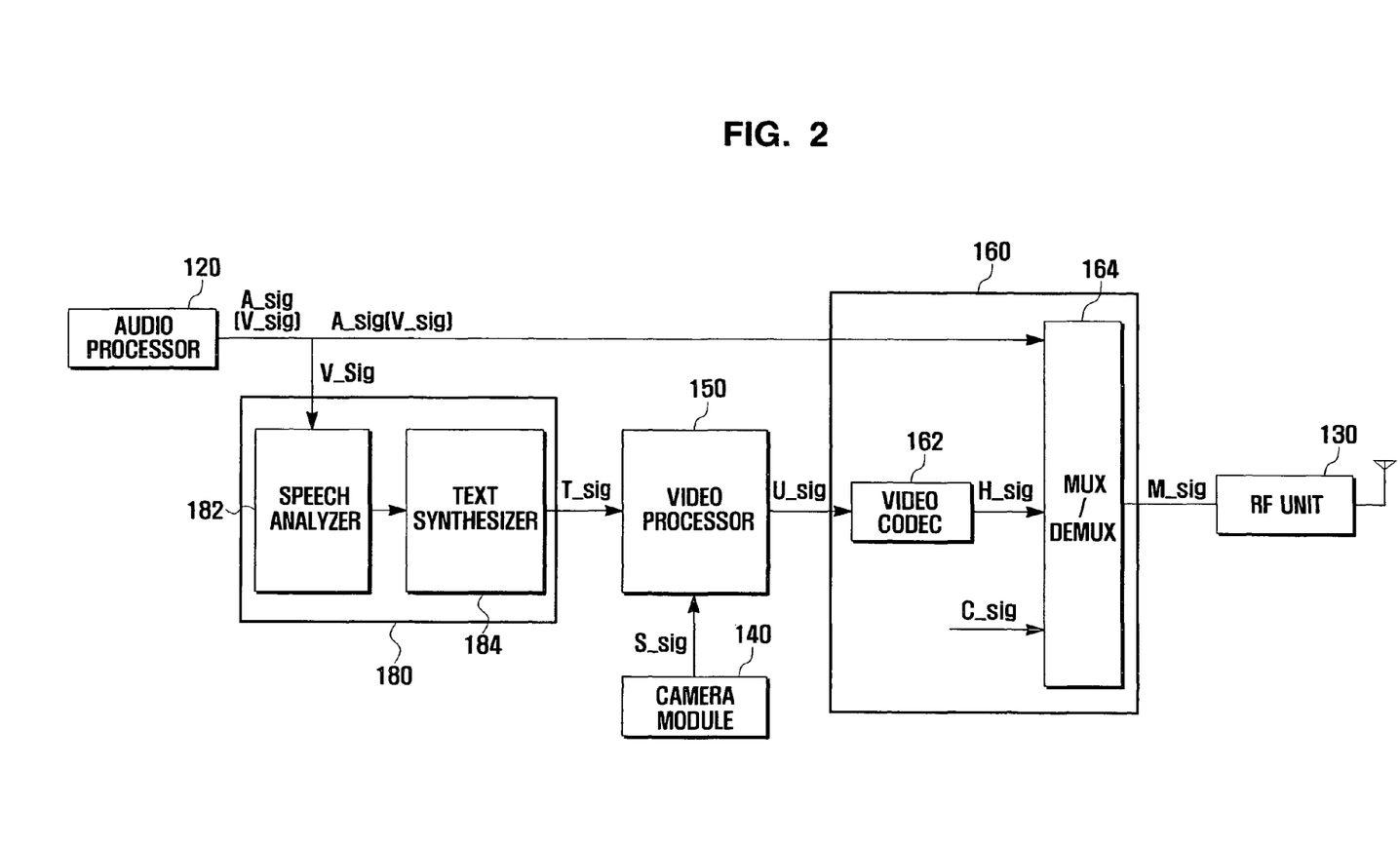
FIG. 2 illustrates a configuration of the video telephony apparatus in FIG. 1.

FIG. 1 illustrates a configuration of a mobile terminal having a video telephony apparatus according to an exemplary embodiment of the present invention. FIG. 2 illustrates a configuration of the video telephony apparatus shown in FIG. 1.

Referring FIGS. 1 and 2, the mobile terminal includes an audio processor 120, caption generator 180, camera module 140, video processor 150, radio frequency (RF) unit 130, key input unit 110, display unit 190, memory unit 170, and control unit 160.

The audio processor 120 reproduces through a speaker SPK an audio signal received by the RF unit 130. In a regular video mode or regular phone mode, the audio processor 120 sends an audio signal (A_sig), including a voice signal (V_sig) of a user, collected by a microphone MIC to the control unit 160. In a captioned video mode, the audio processor 120 sends an audio signal (A_sig) collected by the microphone MIC to the control unit 160, and also sends a voice signal (V_sig) in the audio signal (A_sig) to the caption generator 180.

The caption generator 180 converts a voice signal into a sequence of words through a speech recognition, and includes a speech analyzer 182 and a text synthesizer 184. The speech analyzer 182 analyzes a voice signal (V_sig) to recognize phonemes, morphemes. and syllables. The text synthesizer 184 generates a sequence of words using the syllables recognized by the speech analyzer 182 and converts the sequence of words into a text caption signal (T_sig).

The camera module 140 photographs a target object and outputs an image signal (S_sig) carrying the photographed images to the video processor 150.

The video processor 150 combines an image signal (S_sig) from the camera module 140 and a text caption signal (T_sig) from the caption generator 180 into a video signal (U_sig) in a required video call format, and outputs the video signal (U_sig) to the control unit 160.

The control unit 160 controls the overall operation and signal exchange between the internal elements of the mobile terminal. In particular, the control unit 160 controls the video call processing, and includes a video codec 162 and a multiplexer/demultiplexer (Mux/Demux) 164. The video codec 162 encodes and compresses a video signal (U_sig) from the video processor 150 into a compressed video signal (H_sig). The Mux/Demux 164 multiplexes a compressed video signal (H_sig) from the video codec 162, an audio signal (A_sig) from the audio processor 120, and a control signal (C_sig) into a multiplex signal (M_sig), and outputs the multiplex signal (M_sig) to the RF unit 130. The control signal (C_sig) includes a synchronization data for audio/video/caption synchronization.

The RF unit 130 transmits a multiplex signal (M_sig), from the control unit 160, carrying encoded and compressed video and audio data to another mobile terminal via wireless communication, and receives a multiplex signal from the other mobile terminal. The RF unit 130 includes an RF transmitter for upconverting the frequency of a signal to be transmitted and amplifying the signal, and an RF receiver for low-noise amplifying a received signal and downconverting the frequency of the signal.

The key input unit 110 includes a plurality of alphanumeric and function keys for inputting alphanumeric information and setting various functions. The function keys may include direction, side, and shortcut keys associated with particular functions. The key input unit 110 sends a key signal, input by the user for setting and controlling the operations of the mobile terminal, to the control unit 160. For example, during a video call, the key input unit 110 sends a video mode switch key signal input by the user to the control unit 160.

The display unit 190 displays various menus of the portable terminal, information input by the user, and information to be provided to the user. In particular, the display unit 190 can display an image signal carrying images photographed by the camera module 140. A multiplex signal received by the RF unit 130 can be demultiplexed and decoded through the control unit 160, and displayed on a screen of the display unit 190. The display unit 190 may include a panel of liquid crystal display (LCD) devices. If the panel has a touch screen capability, the display unit 190 can also act as an input means.

The memory unit 170 stores application programs necessary to use the mobile terminal and signals for the video call processing, and provides a buffer space for signal multiplexing and demultiplexing. The memory unit 170 may include a program memory section and a data memory section.

The program memory section of the memory unit 170 stores an operating system for booting the mobile terminal, application programs for playing multimedia contents, application programs for supplementary functions related to photographing and playing of audio and video data, and application programs for speech recognition. When one of these functions is activated in response to a user request, the mobile terminal executes a corresponding application program under the control of the control unit 160.

The data memory section of the memory unit 170 stores user data generating from the operation of the mobile terminal. The data memory section stores data related to supplementary functions such as videos, audios, phonebooks, and digital contents. The data memory section temporarily or permanently stores images photographed by the camera module 140 or received from other mobile terminals.

The mobile terminal may further include, for example, an audio file playing module and digital broadcast receiving module.

Figure 3:
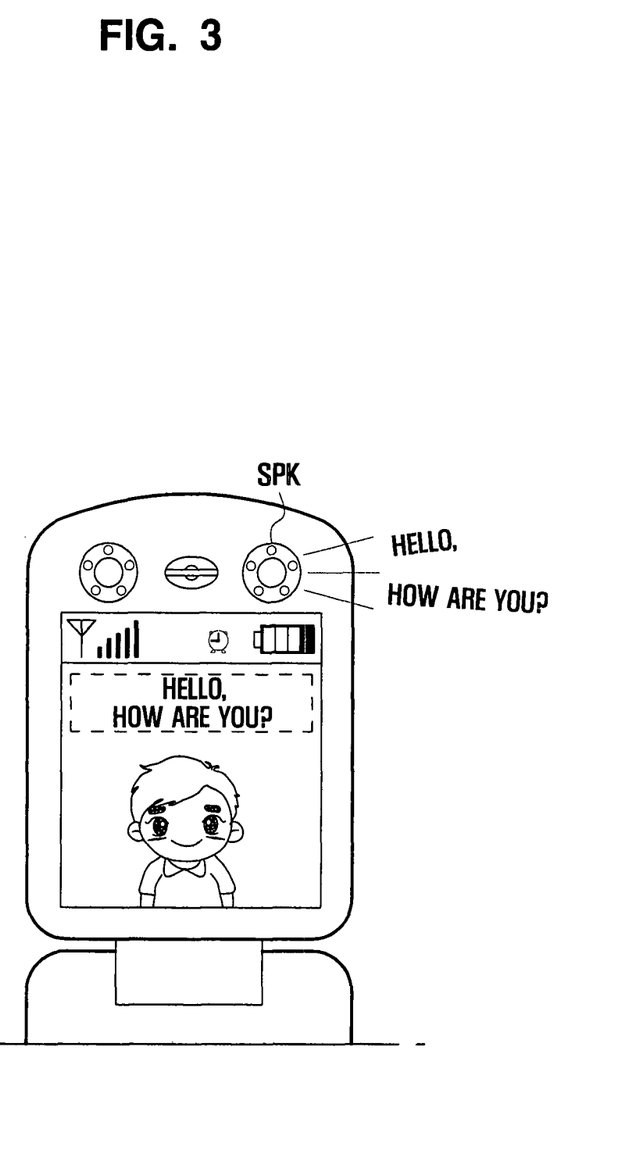
FIG. 3 illustrates a screen representation of a two-party video call with a text caption.

FIG. 3 illustrates a screen representation of a two-party video call with a text caption.

Referring to FIG. 3, a multiplex signal from another mobile terminal is demultiplexed by the control unit 160 into a text caption signal, video signal. and audio signal. The video signal and text caption signal are displayed on a screen of the display unit 190, and the audio signal is reproduced through a speaker SPK. A text caption can be displayed on a video image in an overlapped manner or be displayed in a separate area on the screen. The display location (preferably, an the edge area of the screen for clear viewing) and the size of a text caption can be adjusted according to user settings. The text caption signal, video signal, and audio signal are synchronized with one another.

Figure 4:
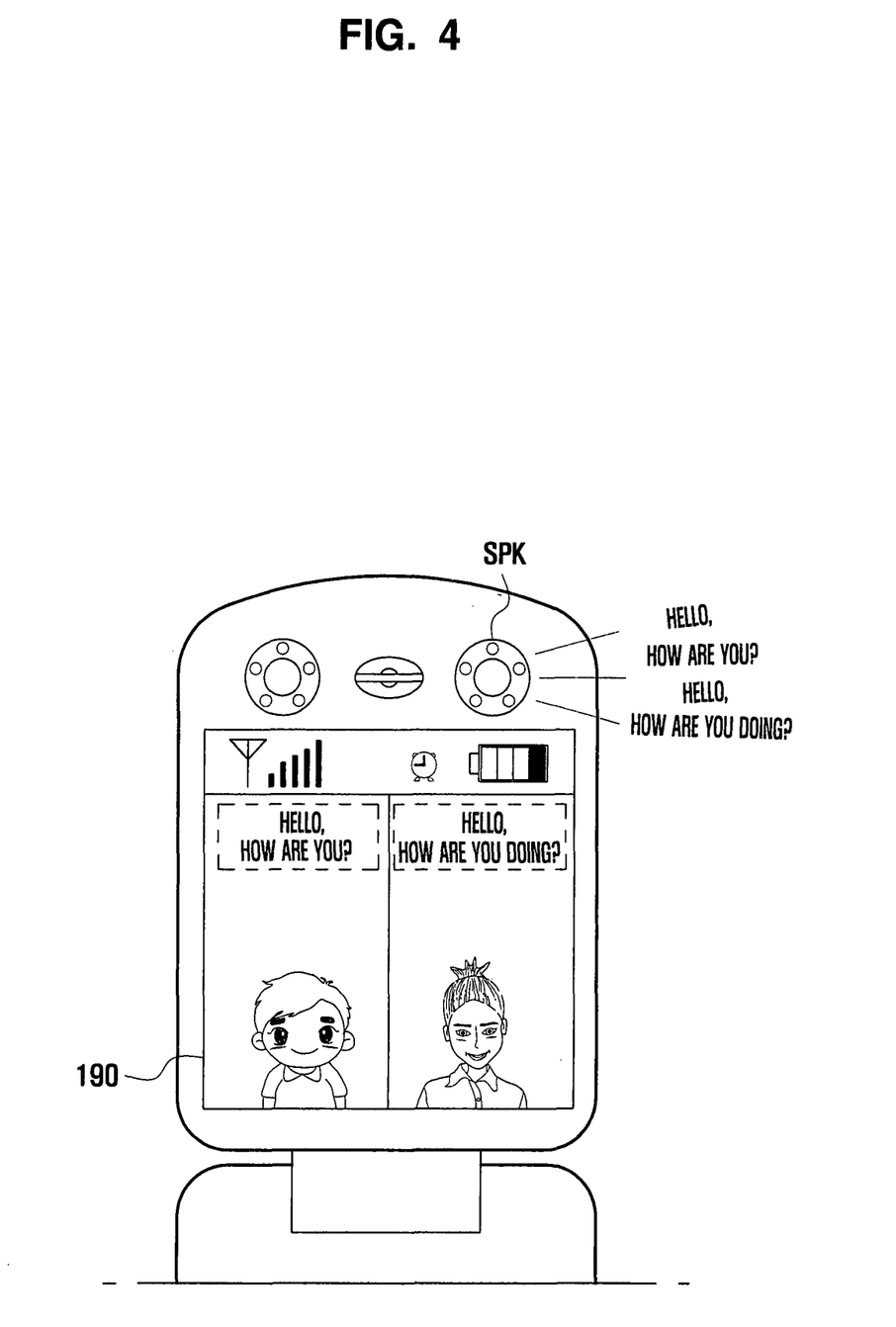
FIG. 4 illustrates a screen representation of a three-party video call with a text caption.

FIG. 4 illustrates a screen representation of a three-party video call with a text caption.

Referring to FIG. 4, the screen of the display unit 190 is split into display areas according to the number of participants. Each of multiplex signals from different mobile terminals is demultiplexed into a text caption signal, video signal, and audio signal. The video signal and text caption signal are displayed in a corresponding display area of the screen, and the audio signal is reproduced through a speaker SPK. The text caption can be displayed on a corresponding video image in an overlapped manner or be displayed in a separate section of the corresponding display area of the screen. The display location (preferably, an edge area of the corresponding display area for clear viewing) and size of a text caption can be adjusted according to user settings. The text caption signal, video signal, and audio signal of one multiplex signal are synchronized with one another.

Figure 5:
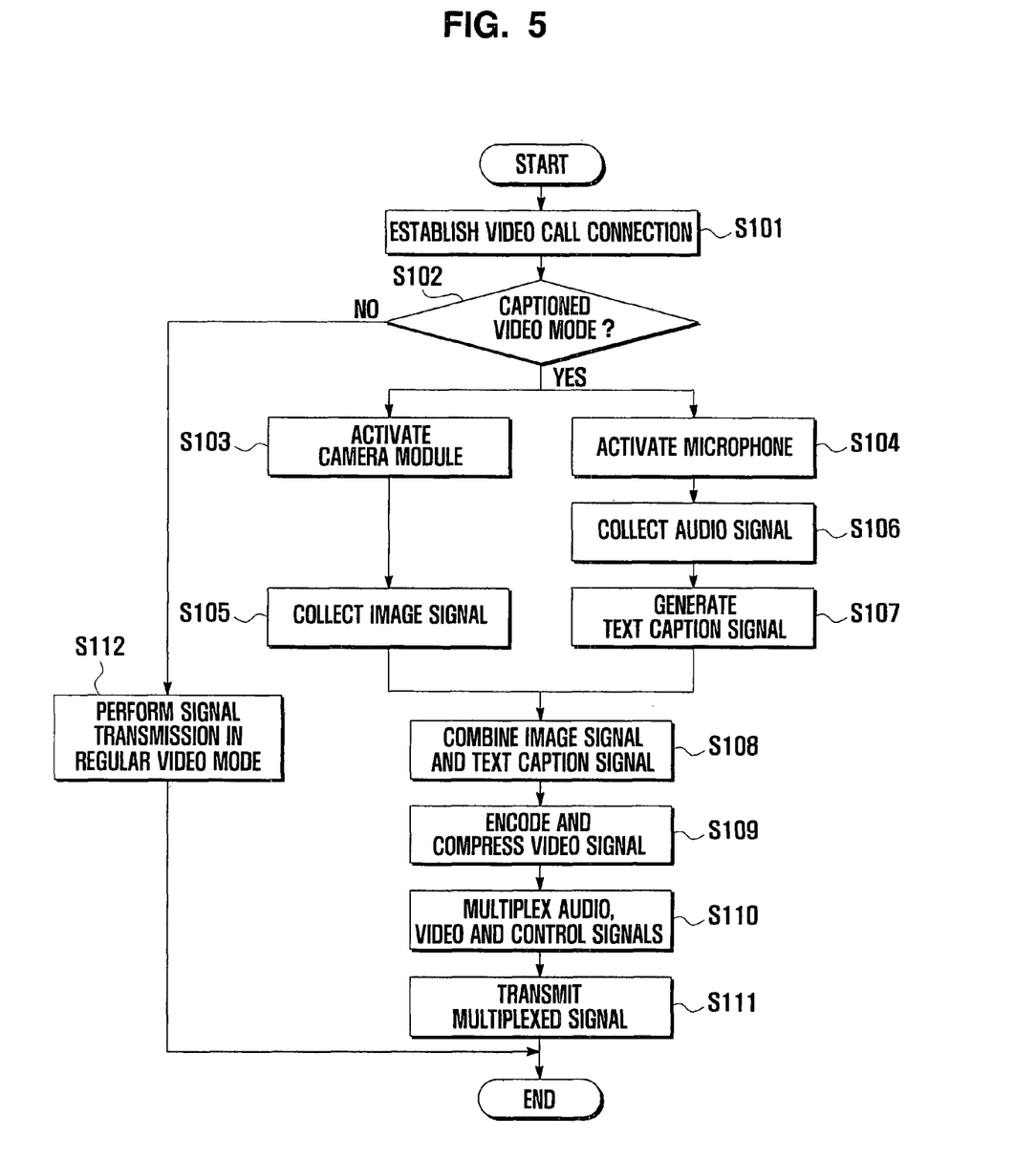
FIG. 5 is a flow chart illustrating a multiplex signal transmitting method for video call processing according to another exemplary embodiment of the present invention.

FIG. 5 is a flow chart illustrating a multiplex signal transmitting method for video call processing according to another exemplary embodiment of the present invention.

Referring to FIG. 5, in response to a user request, the control unit 160 of the mobile terminal controls the RF unit 130 to establish a video call connection to another mobile terminal (S101). The control unit 160 requests the sending user to decide whether to set a captioned video mode (S102).

If the sending user decides to set a captioned video mode, the control unit 160 activates the camera module 140 (S103), and also activates the microphone MIC (S104).

The control unit 160 receives an image signal (S_sig) carrying images of a target object photographed by the camera module 140 (S105). The control unit 160 receives an audio signal (A_sig) including a voice signal (V_sig) of the sending user from the microphone MIC (S106), and controls the generation of a text caption signal (T_sig) using the received audio signal (S107).

At step S107, the control unit 160 controls the speech analyzer 182 of the caption generator 180 to recognize phonemes, morphemes, and syllables from the voice signal, and also controls the text synthesizer 184 to generate a sequence of words using the recognized syllables and to convert the sequence of words into a text caption signal.

The control unit 160 controls the video processor 150 to combine the text caption signal and the image signal into a video signal (U_sig) while maintaining caption/video synchronization (S108).

The control unit 160 encodes and compresses the video signal into a compressed video signal (H_sig) (S109).

The control unit 160 multiplexes the compressed video signal, the audio signal, and a control signal (C_sig) into a multiplex signal (M_sig) (S110). At step S110, the control signal may include synchronization data for audio/video synchronization.

The control unit 160 controls the RF unit 130 to transmit the multiplex signal to the other mobile terminal (S111).

If the sending user decides not to set a captioned video mode at step S102, the control unit 160 performs the signal transmission in a regular video mode, in which a text caption is not provided (S112).

Figure 6:
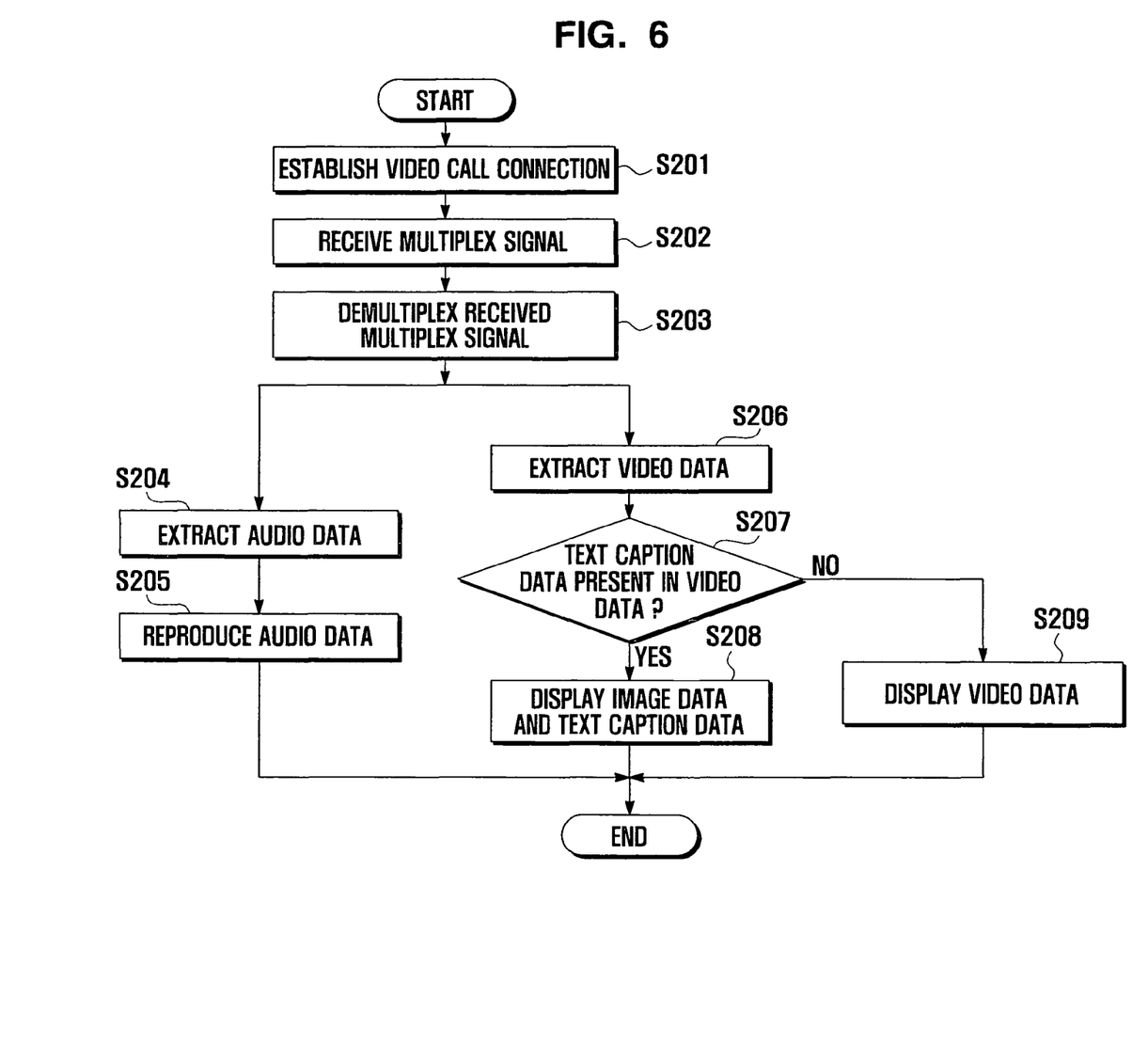
FIG. 6 is a flow chart illustrating a multiplex signal receiving method for video call processing according to another exemplary embodiment of the present invention.

FIG. 6 is a flow chart illustrating a multiplex signal receiving method for video call processing according to another exemplary embodiment of the present invention.

Referring to FIG. 6, in response to a user request, the control unit 160 of the mobile terminal controls the RF unit 130 to establish a video call connection to another mobile terminal (S201). The control unit 160 controls the RF unit 130 to receive a multiplex signal from the other mobile terminal (S202). The multiplex signal may carry audio, video, and control data. The control data includes audio/video synchronization information.

The control unit 160 demultiplexes the received multiplex signal (S203).

The control unit 160 extracts an audio signal from the demultiplexed signals (S204) and reproduces the extracted audio signal through a speaker SPK (S205).

The control unit 160 extracts a video signal from the demultiplexed signals (S206) and checks whether text caption data is present in the extracted video signal (S207).

If text caption data is present, the control unit 160 displays the video signal and caption data through the display unit 190 in a synchronized manner (S208). The caption data may be displayed as a text caption at the edge region of the screen for clear viewing.

If text caption data is not present, the control unit 160 displays the video signal through the display unit 190 (S209).

Reproduction of the audio signal at step S205 and display of the video signal at step S208 or step S209 are synchronized with each other, and are preferably performed independently from each other for smoother conversations in the case of occurrence of transmission errors.

As apparent from the above description, the present invention provides a video telephony apparatus and signal transmitting/receiving method for a mobile terminal that provide a text caption corresponding to a voice signal along with video images for clearer phone conversations.

While exemplary embodiments of the present invention have been shown and described in this specification, it will be understood by those skilled in the art that various changes or modifications of the embodiments are possible without departing from the spirit and scope of the invention as defined by the appended claims.

What is claimed is:

1. A signal transmitting method for a transmitting mobile terminal, comprising:
   establishing a video call connection to a receiving mobile terminal;
   setting a captioned video mode according to a user selection;
   collecting both an image signal carrying a photographed image and an audio signal including a voice signal;
   generating a text caption signal using the voice signal;
   combining the text caption signal and image signal into a video signal without the voice signal;
   encoding and compressing the video signal; and
   multiplexing the compressed video signal and the audio signal into a multiplex signal, and transmitting the multiplex signal to the receiving mobile terminal.

2. The signal transmitting method of claim 1, wherein the generating the text caption signal step comprises:
   analyzing the voice signal to recognize phonemes, morphemes, and syllables;
   generating a sequence of words using the recognized syllables; and
   converting the generated sequence of words into the text caption signal.

3. The signal transmitting method of claim 1, wherein the multiplex signal further includes a control signal for audio/video synchronization.

4. The signal transmitting method of claim 1, wherein a text caption corresponding to the text caption signal is displayed at an edge region of a display unit of the other mobile terminal, and a display size of the displayed text caption is adjustable.

5. A signal receiving method for a receiving mobile terminal, comprising:
   establishing a video call connection to a transmitting mobile terminal;
   receiving a multiplex signal through the video call connection from the transmitting mobile terminal;
   demultiplexing the received multiplex signal into an audio signal, a compressed video signal without a voice signal being compressed thereon, and a control signal;
   reproducing the audio signal through a speaker;
   separating the compressed video signal into a text caption signal and an image signal;
   displaying the text caption signal and the image signal in a manner synchronized with the audio signal.

6. The signal receiving method of claim 5, wherein audio reproduction and video display are performed independently from each other.

7. The signal receiving method of claim 5, wherein the displaying step comprises:
   displaying the image signal on a full screen of a display unit; and
   displaying the text caption signal in a display area allocated on the screen or in a manner overlapped with displayed images on the screen.

8. The signal receiving method of claim 5, wherein the control signal carries synchronization data for audio/video synchronization.

9. The signal receiving method of claim 5, wherein a text caption corresponding to the text caption signal is displayed at an edge region of a screen of a display unit, and a display size of the displayed text caption is adjustable.

10. A signal transmitting/receiving method for mobile terminals, comprising:
    establishing a video call connection between a transmitting mobile terminal and a receiving mobile terminal;
    converting a voice signal in a collected audio signal into a text caption signal;
    combining the text caption signal and image signal into a video signal without the voice signal;
    encoding and compressing the video signal;
    multiplexing the audio signal and a compressed video signal into a multiplex signal;
    transmitting the multiplex signal through the video call connection;
    receiving the multiplex signal through the video call connection; and
    demultiplexing the received multiplex signal into the compressed video signal and audio data, and outputting the audio data.

11. The signal transmitting/receiving method of claim 10, further comprising
    combining the compressed video signal and the audio signal.

12. The signal transmitting/receiving method of claim 10, wherein the demultiplexing step comprises:
    reproducing the audio data through a speaker; and
    displaying text caption data and image data from the compressed video signal.

13. The signal transmitting/receiving method of claim 10, wherein the multiplex signal further includes a control signal for audio/video synchronization.

14. The signal transmitting/receiving method of claim 12, wherein a text caption corresponding to the text caption data is displayed at an edge region of a screen of a display unit in the receiving mobile terminal, and a display size of the displayed text caption is adjustable.

15. A video telephony apparatus for a mobile terminal, comprising:
    a radio frequency unit for establishing a video call connection with another mobile terminal;
    an audio processor for collecting and reproducing an audio signal including a voice signal;
    a caption generator for converting the voice signal into a text caption signal;
    a camera module for photographing a target object to generate an image signal carrying photographed images;
    a video processor for combining the text caption signal and image signal into a video signal without the voice signal;
    a display unit for displaying visual image data; and
    a control unit for controlling the radio frequency unit to transmit the video signal; wherein the control unit comprises: a video coder/decoder for encoding and compressing the video signal; and a multiplexer/demultiplexer for multiplexing the compressed video signal and the audio signal into a multiplex signal, and for demultiplexing a received multiplex signal.

16. The video telephony apparatus of claim 15, wherein the caption generator comprises:
    a speech analyzer for analyzing the voice signal to recognize phonemes, morphemes and syllables; and
    a text synthesizer for generating a sequence of words using the recognized syllables and converting the sequence of words into a text caption signal.

17. The video telephony apparatus of claim 15, wherein the multiplex signal further includes a control signal for audio/video synchronization.

18. The video telephony apparatus of claim 15, wherein the display unit displays video data of the received multiplex signal on a full screen, and displays text caption data of the received multiplex signal in a display area allocated on the screen or in a manner overlapped with the displayed video data.

19. The video telephony apparatus of claim 18, wherein a text caption corresponding to the text caption data is displayed at an edge region of the screen, and a display size of the displayed text caption is adjustable.

* * * * *